United States Patent
Bertolotti et al.

(10) Patent No.: US 9,001,498 B2
(45) Date of Patent: Apr. 7, 2015

(54) SWITCHGEAR CABINET FOR A WIND TURBINE

(75) Inventors: Fabio Bertolotti, Bad Bentheim (DE);
Hermann Kestermann, Rheine (DE);
Marc-Andre Thier, Ascheberg (DE);
Tobias Bueltel, Rheine (DE); Josef Upsing, Rheine (DE); Tobias Daemberg, Thuine (DE); Norbert Wibben, Salzbergen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 422 days.

(21) Appl. No.: 13/510,184

(22) PCT Filed: Oct. 14, 2010

(86) PCT No.: PCT/EP2010/065377
§ 371 (c)(1),
(2), (4) Date: May 16, 2012

(87) PCT Pub. No.: WO2011/061016
PCT Pub. Date: May 26, 2011

(65) Prior Publication Data
US 2012/0224295 A1    Sep. 6, 2012

(30) Foreign Application Priority Data

Nov. 17, 2009  (DE) .................... 20 2009 018 040 U

(51) Int. Cl.
*H02B 1/00*  (2006.01)
*F03D 11/00*  (2006.01)
(Continued)

(52) U.S. Cl.
CPC ............ *F03D 11/00* (2013.01); *F03D 11/0066* (2013.01); *H01M 2/1072* (2013.01); *H01M 2/1094* (2013.01); *H01M 10/5006* (2013.01);
(Continued)

(58) Field of Classification Search
CPC ............ H02J 3/386; H02J 3/32; H02B 3/386; H02B 3/32
See application file for complete search history.

(56) References Cited

U.S. PATENT DOCUMENTS

| | | | |
|---|---|---|---|
| 5,198,638 A | 3/1993 | Massacesi | |
| 6,233,137 B1 * | 5/2001 | Kolos et al. | 361/603 |

(Continued)

FOREIGN PATENT DOCUMENTS

| | | |
|---|---|---|
| DE | 20 2005 007450 U1 | 7/2005 |
| DE | 10 2005 034899 A1 | 2/2007 |

(Continued)

OTHER PUBLICATIONS

International Search Report (in German with English translation) and Written Opinion (in German) for PCT/EP2010/065377, mailed Apr. 20, 2011; ISA/EP.

(Continued)

*Primary Examiner* — Gregory Thompson
(74) *Attorney, Agent, or Firm* — Harness, Dickey & Pierce, P.L.C.

(57) ABSTRACT

The invention relates to a control cabinet for a wind turbine including a cabinet body (24) defining an inner chamber (23) and having a peripheral wall (40). One or more electric circuits (19, 20, 21) are arranged in the inner chamber (23) and one or more electric energy storage modules (50) which are secured to the cabinet body (24). The energy storage modules (50) are arranged on an exterior side of the cabinet body and are detachably secured thereto.

27 Claims, 9 Drawing Sheets

Figure 1:
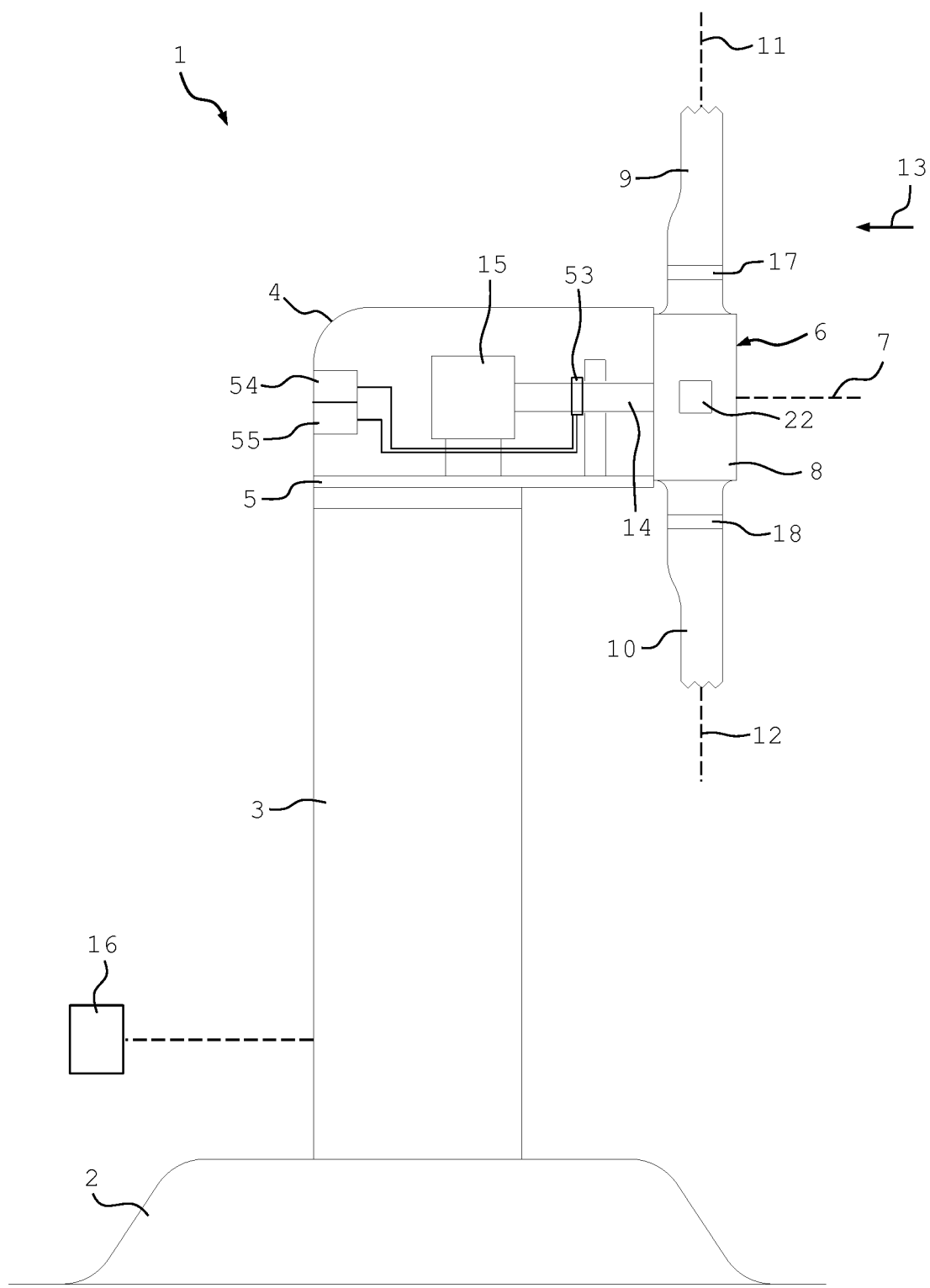

(51) Int. Cl.
*H01M 2/10* (2006.01)
*H01M 10/615* (2014.01)
*H01M 10/627* (2014.01)
*H01M 10/63* (2014.01)

(52) U.S. Cl.
CPC ........ *H01M 10/5018* (2013.01); *H01M 10/502* (2013.01); *F05B 2240/14* (2013.01); *F05B 2260/507* (2013.01); *F05B 2260/76* (2013.01); *Y02E 10/722* (2013.01)

(56) References Cited

U.S. PATENT DOCUMENTS

| 7,256,509 | B2 | 8/2007 | Brandt et al. |
| 2006/0163882 | A1 | 7/2006 | Brandt |
| 2007/0119185 | A1 | 5/2007 | Pfannenberg |
| 2009/0021078 | A1* | 1/2009 | Corhodzic et al. ............... 307/67 |
| 2010/0046146 | A1* | 2/2010 | Christensen et al. ......... 361/605 |
| 2011/0037267 | A1* | 2/2011 | Kestermann et al. ........... 290/55 |

FOREIGN PATENT DOCUMENTS

| DE | 103 38 127 B4 | 9/2007 |
| DE | 10 2006 057213 A1 | 6/2008 |
| DE | 10 2004 007 728 B4 | 6/2009 |
| DE | 10 2008 019755 A1 | 10/2009 |
| DE | 10 2008 038 740 A1 | 2/2010 |
| EP | 1 791 413 A1 | 5/2007 |
| EP | 1 903 213 A2 | 3/2008 |
| EP | 1 942 273 A2 | 7/2008 |

OTHER PUBLICATIONS

International Preliminary Report on Patentability (Chapter I of the Patent Cooperation Treaty) for PCT/EP2010/065377, issued Jun. 12, 2012.

* cited by examiner

SWITCHGEAR CABINET FOR A WIND TURBINE

CROSS-REFERENCE TO RELATED APPLICATIONS

This application is a 371 U.S. National Stage of International Application No. PCT/EP2010/065377, filed Oct. 14, 2010, and claims priority to German Patent Application No. 20 2009 018 040.9, filed Nov. 17, 2009, the disclosure of which are herein incorporated by reference in their entirety.

The present invention relates to a switchgear cabinet for a wind turbine, with a cabinet body defining an inner chamber, which comprises a peripheral wall, one or a plurality of electric circuits arranged in the inner chamber, and one or a plurality of electrical energy storage modules that are securely connected to the cabinet body. The invention also relates to an energy storage module for such a switchgear cabinet.

An electrical switchgear cabinet is used for example in the form of a switchgear cabinet in a wind turbine for the emergency power supply of a blade angle adjustment device (pitch system), which serves for the adjustment of one or a plurality of rotor blades of the wind turbine. The emergency power supply comprises one or a plurality of energy storage devices, which in the event of a power failure or a power interruption maintain the energy supply to the blade angle adjustment device.

Such an emergency power supply is known for example from DE 103 38 127 B4. As energy storage devices chargeable accumulators are used, which are arranged in one or a plurality of separate cabinets (accumulator cabinets). Alternatively capacitors, such as for example so-called ultracaps, can also be used as energy storage devices. The switchgear cabinet (which is also terms converter cabinet) as well as the accumulator cabinets are as a rule arranged in the rotating part of the wind turbine, in particular in its rotor hub. The cabinets are in this connection subjected to extreme climatic and mechanical stresses and have to be appropriately designed as regards their structure. The switchgear cabinet and the accumulator cabinet are on account of the constricted spatial conditions in the hub normally arranged close next to one another, and in some cases are also already designed in the form of modules, which are provided in a housing subdivided into a plurality of areas. The areas form or comprise in this case the modules, the housing being closed by a common cover.

A heatable accumulator cabinet with accumulator elements is also known from DE 10 2008 038 740 A1. This accumulator cabinet comprises a plurality of accumulators, which are arranged in groups (so-called accumulator packs). After a certain time the charge of the accumulators is exhausted, so that they have to be replaced. However, DE 10 2008 038 740 A1 does not disclose the possibility of replacing the battery packs. Normally the accumulator switchgear cabinets are opened in order to replace the accumulator packs and are then closed again. On account of the constricted spatial conditions in the rotor hub of a wind turbine such a replacement is however difficult to carry out.

Switchgear cabinet or rack arrangements with an electrical power device in the form of accumulator units are known from DE 10 2004 007 728 B4, in which the accumulators are accommodated in a vertical support device. The switchgear cabinet comprises a swivel mechanism for replacing the accumulators, with which the support device can be swivelled out from its position in the switchgear cabinet in order to exchange the accumulators. Such a swivel mechanism is of course in principle also feasible for switchgear cabinets in wind turbines, although not inconsiderable requirements are placed on the sealing of the swivel mechanism. Furthermore, adequate free space is necessary for the swivelling of the swivel mechanism, which is problematic on account of the restricted spatial conditions in the rotor hub of a wind turbine.

Against this background the object of the invention is to be able to replace as simply as possible in a switchgear cabinet of the type mentioned in the introduction, the electrical energy storage module(s) even under restricted spatial conditions.

This object is achieved with a switchgear cabinet according to claim 1. Preferred developments of the invention are disclosed in the subclaims.

The switchgear cabinet according to the invention for a wind turbine comprises a cabinet body defining an inner chamber, which has a peripheral wall, one or a plurality of electric circuits arranged in the inner chamber, as well as one or a plurality of electrical energy storage modules that are connected to the cabinet body, wherein the energy storage module(s) are arranged on an outer side of the cabinet body and are detachably secured thereto.

Due to the detachable securement of the energy storage module(s) arranged on the outer side of the cabinet body to the cabinet body itself, a replacement of the energy storage module(s) is possible without having to open the switchgear cabinet. In this way the replacement of the energy storage module(s) is significantly simplified where spatial conditions are restricted. Furthermore, hermeticity problems connected with the opening of the switchgear cabinet can be avoided. Since the energy storage module(s) are not arranged in the inner chamber of the switchgear cabinet, the cabinet body can be designed relatively small, so that the switchgear cabinet as a whole can be kept to an acceptable size. For example, 6 or 12 energy storage modules are arranged on the outer side of the cabinet body. A different number of energy storage modules is however also possible.

The cabinet body is in particular secured to or in the wind turbine. Preferably the cabinet body is secured to or in a rotor of the wind turbine rotatable about a rotor axis, the rotor comprising a rotor hub and a plurality of rotor blades mounted thereon that respectively extend from the rotor hub along a blade axis running transverse or substantially transverse to the rotor axis. The cabinet body is preferably arranged in the rotor hub and in particular is secured thereto.

According to a development of the invention a blade angle adjustment device is associated with each of the rotor blades, by means of which the respective rotor blade can rotate about its blade axis, wherein each of the blade angle adjustment devices comprises in particular one or at least one of the electric circuits.

The inner chamber is preferably subdivided by one or more partitions into a plurality of inner chamber regions. The number of inner chamber regions is preferably larger than or equal to the number of rotor blades. In particular an inner chamber region of the inner chamber regions is associated with each of the rotor blades, in which region is arranged the electric circuit of the blade angle adjustment device associated with the respective rotor blade. The partitions ensure that in this case a component that has become detached in one of the inner chamber regions can damage only the electric circuit arranged in this inner chamber region. The detached component is prevented by the partitions from damaging the electric circuits in other chamber regions.

According to a modification of the invention the cabinet body comprises two front sides, which are preferably closed, at least one of the front sides preferably being formed as a removable lid. The inner chamber is thus accessible for repair and maintenance purposes. The other of the front sides forms for example a floor. In addition the other front side can be installed close to a wall, formed for example by the outer wall of the rotor hub. A relatively large free space for removing the lid is thus available in the rotor hub. The front sides of the cabinet body are therefore preferably free from the energy storage module(s). Preferably the energy storage module(s) are arranged on the outer side of the wall. In this case an arrangement formed from the energy storage modules can surround the cabinet body.

Electric terminals are preferably provided on the cabinet body, and in particular are electrically connected to the electric circuit(s). These electric terminals are preferably provided externally on the cabinet body and/or are accessible from outside. The electrical connections between the terminals and the circuit(s) preferably pass through the cabinet body, in particular through its wall. The energy storage module(s) are advantageously electrically connected to one or a plurality of the terminals. In particular the energy storage module(s) are electrically connected via the one or a plurality of terminals to the circuit(s). Preferably the energy storage module(s) are detachably connected to the one or more terminals. In particular the energy storage module(s) are respectively connected via a plug-type connection to the one or a plurality of terminals. It is therefore possible to connect the energy storage module(s) electrically from outside to the circuit(s). Furthermore it is possible from outside to separate the energy storage module(s) electrically from the circuit(s).

According to a development of the invention the energy storage module(s) are slideably and/or displaceably mounted on the cabinet body. In particular the energy storage module(s) are slideably and/or displaceably mounted in a guide direction on the cabinet body. Accordingly the energy storage module(s) can be removed from the cabinet body, in particular in the guide direction. In this way a significant reduction of the operational effort involved in exchanging the energy storage module(s) can be achieved. The guide direction preferably runs parallel or substantially parallel to the rotor axis, so that the rotation of the rotor exerts no forces or only relatively small forces in the guide direction on the energy storage module(s). Furthermore it is possible to arrange a plurality, in particular two of the energy storage modules, behind one another in the guide direction. Preferably guides, advantageously in the form of slide guides, are provided on the outer side of the cabinet body, in particular on the outer side of the wall, by means of which the energy storage module(s) are slideably and/or displaceably guided on the cabinet body. Preferably the energy storage module(s) are slideably and/or displaceably guided by means of the guides in the guide direction on the cabinet body. The energy storage module(s) can be guided directly on the guides. Alternatively however one or a plurality of thrust elements may also be provided, which accommodate the energy storage module(s) and are slideably and/or displaceably guided on the guides. The thrust elements may for example be designed in each case in the form of a drawer or the like.

According to a development of the invention supports or carriers are arranged on the wall, which are mounted on the outside of the wall and are securely connected thereto. The energy storage module(s) are preferably mounted, in particular secured, to the carriers (supports). Preferably the carriers form or include the guides on which the energy storage module(s) are slideably guided, preferably in the guide direction. The carriers can also serve to stiffen the cabinet body. Preferably the carriers are formed of steel. In particular the electric terminals are provided on the carriers.

The circumferential contour of the wall preferably forms a polygon, in particular a hexagon. The carriers are preferably arranged on at least two corners or on the corners of the wall. There the carriers can therefore also be termed corner carriers.

The function of the energy storage module(s) can be adversely affected at relatively low ambient temperatures. According to a modification of the invention the energy storage module(s) in each case comprise a or at least one heating element, by means of which the respective energy storage module can be heated. The heating element is designed for example in the form of an electric heating. According to a development of the invention the energy storage module(s) comprise in each case a or at least one temperature sensor, by means of which the temperature of the respective energy storage module can be measured. The temperature of each energy storage module can thus be regulated. Preferably the heating element(s) as well as the temperature sensor(s) of each energy storage module are coupled to a temperature regulation device. In this connection a separate temperature regulation device can be provided respectively for each of the energy storage modules or for a group of a plurality of energy storage modules.

Furthermore the function of the energy storage module(s) can be adversely affected at relatively high ambient temperature. According to a modification of the invention the switchgear cabinet and/or each of the energy storage modules comprises one or a plurality of cooling elements, by means of which the energy storage module(s) can be cooled. The cooling element(s) are designed for example in the form of Peltier elements. Furthermore the cooling element(s) are preferably provided on the carriers. This offers the advantage that the cooling element(s) can be brought into close spatial proximity to the energy storage module(s) and at the same time can be connected up electrically relatively simply, since cable ducts are preferably provided in the region of the carriers in the wall of the cabinet body, through which pass in particular the electrical connections between the terminals and the circuit(s). Moreover, Peltier elements are relatively costly, so that for this reason too the cooling element(s) are preferably arranged outside the energy storage module(s). In this way the costs for the energy storage modules can be kept relatively low. The energy storage module(s) are preferably cooled by convection.

A climatisation and temperature control of the energy storage module(s) is possible by means of the heating element(s), the temperature sensor(s), as well as the cooling element(s), so that the modules can be kept in an optimal operating temperature range. For this purpose the cooling element(s) are preferably coupled to the temperature regulation device (s).

The blade angle adjustment devices preferably comprise in each case a or at least one electric and/or electrically operable blade angle adjustment drive, which is preferably mechanically coupled to the respective rotor blade. In particular the blade angle adjustment drives are arranged outside the cabinet body. Preferably the blade angle adjustment drives are in each case electrically connected to one of the terminals. In particular the blade angle adjustment drives are electrically connected via these terminals to the circuits. Preferably each of the blade angle adjustment drives is detachably connected to the respective terminal. In particular each of the blade angle adjustment drives is connected via a plug-type connection to the respective terminal. It is therefore possible to connect from outside the blade angle adjustment drives electrically to the circuit(s). Furthermore it is possible from outside to separate the blade angle adjustment drives electrically from the circuit(s).

According to a modification of the invention the rotor is rotatably mounted about the rotor axis on a nacelle. Preferably one or a plurality of electrical connecting leads are respectively electrically connected to one or a plurality of the terminals, and the leads are preferably led via a slip-ring arrangement to the nacelle. It is therefore possible to communicate electrically with the electric circuit(s) from a point outside the rotor. In particular the one or the plurality of electrical connecting leads are electrically connected to a power supply device and/or to a control device of the wind turbine, the power supply device and/or the control device preferably being provided outside the rotor.

In the event of a failure or interruption of the power supply of the electric circuits and/or of the blade angle adjustment drives, the electric circuits and/or the blade angle adjustment drives can continue to be operated by means of the energy storage module(s). In particular the blade angle adjustment devices can continue to be operated by means of the energy storage module(s) in the event of a failure or interruption in their power supply. The energy storage module(s) thus form an emergency power supply for the electric circuits and/or the blade angle adjustment drives and/or the blade angle adjustment devices.

The energy storage module(s) preferably comprise respectively one or a plurality of electrical energy storage devices, which for example are designed in each case as an accumulator or as an electrical capacitor. The energy storage module(s) thus preferably comprise respectively one or a plurality of accumulators and/or electrical capacitors. The accumulators are also termed storage batteries, and are preferably rechargeable batteries. The accumulators are preferably lead accumulators. Double-layer capacitors, in particular so-called ultracaps, are preferably used as capacitors. For example, six or eight energy storage devices are provided for each energy storage module. A different number of energy storage devices per energy storage module is however also possible.

According to a development of the invention the cabinet body is composed of a plurality of segments, which respectively include a segment body defining a segment inner chamber, the segment body having a peripheral segment wall. The segment inner chambers form respectively a part of the inner chamber of the cabinet body, outer wall parts of the segment walls forming respectively a part of the wall. The segment inner chambers form in particular the inner chamber regions of the cabinet body, the partitions being formed by the segment walls. This modular construction of the switchgear cabinet provides manufacturing advantages, in particular since the segments are preferably constructed identically. Preferably an or at least one of the energy storage modules is secured on the outside to each of the segment walls. Preferably a plurality of the energy storage modules are secured on the outside to each of the segment walls. Furthermore, in particular an or at least one of the electric circuits is respectively arranged in each of the segment inner chambers.

The cabinet body is preferably arranged radially centrally in the rotor hub. Accordingly the energy storage module(s) are easily accessible, in particular when they are arranged on the wall. The cabinet body can furthermore be arranged axially centrally with respect to the rotor axis in the rotor hub or on the outer wall of the rotor hub.

The invention furthermore relates to a wind turbine with a rotor rotatably mounted about a rotor axis on a nacelle as well as a rotor hub and a plurality of rotor blades mounted thereon, which respectively extend from the rotor hub in the direction of a blade axis running transverse or substantially transverse to the rotor axis, a switchgear cabinet according to the invention being arranged in the rotor hub. The wind turbine according to the invention can be developed in accordance with all modifications discussed in connection with the switchgear cabinet according to the invention.

In particular the rotor blades of the wind turbine are rotatable by means of blade angle adjustment devices about their blade axes relative to the rotor hub, wherein preferably each of the blade angle adjustment devices includes an or at least one of the electric circuits arranged in the cabinet body.

The invention also relates to an electrical energy storage module for a switchgear cabinet, with a housing and with one or a plurality of electrical energy storage devices arranged in the housing, wherein the housing can be or is detachably secured to an outer side of a cabinet body of the switchgear cabinet. The switchgear cabinet is in particular a switchgear cabinet according to the invention. The energy storage module can be developed according to all modifications discussed in connection with the switchgear cabinet according to the invention. Furthermore the switchgear cabinet according to the invention can be developed in accordance with all modifications explained in connection with the electrical energy storage module according to the invention.

According to a modification of the energy storage module an or at least one heating element, for example in the form of an electric heating device, is arranged in the housing, by means of which the energy storage device(s) can be heated. This is advantageous since the functional capability of the energy storage module is adversely affected below certain temperatures. Preferably a thermally conducting intermediate element is arranged between the heating element and the energy storage device(s). The heat released by the heating element can be released as uniformly as possible through the heating element to the energy storage device(s). The energy storage device(s) are preferably heated by convection. Furthermore the energy storage device(s) are preferably arranged in a thermally insulating casing that is provided in the housing. In this way a rapid cooling of the energy storage device(s) can be prevented. The heating element and/or the thermally conducting intermediate element are preferably also arranged in the thermally insulating casing.

According to a development of the energy storage module a or at least one temperature sensor is arranged in the housing, which in particular is in thermally conducting contact with the energy storage device(s). The heating element and the temperature sensor can thus be connected to a temperature regulation device, by means of which the temperature of the energy storage device(s) can be adjusted. The temperature regulation device is preferably arranged in the cabinet body.

The energy storage device(s) are in particular fixed in the housing by means of a holder. Preferably the holder is formed by a clamping mechanism or clip. Preferably the energy storage device(s) are detachably fixed in the housing by means of the holder, so that it is possible to replace the energy storage device(s).

According to a modification of the energy storage module a degassing device is arranged in the housing wall, by means of which gases released by the energy storage device(s) can be vented to the outside. The degassing device includes for example a gas-permeable membrane, so that liquids cannot pass through the degassing device. Alternatively however the degassing device can also be formed as a valve. Gases can be released in particular under a heavy loading of the energy storage devices.

Preferably the housing has a cable duct, through which a cable electrically connected to the energy storage device(s) is led out from the housing. The cable can is in particular connected to or can be connected to one of the electrical terminals.

According to a development of the invention each of the energy storage devices comprises a or at least one accumulator or a or at least one electrical capacitor. The accumulators are preferably lead storage batteries. Double-layer capacitors, in particular so-called ultracaps, are preferably used as capacitors.

The energy storage module includes for example six or eight energy storage devices. A different number of energy storage devices is however also possible.

Figure 2:
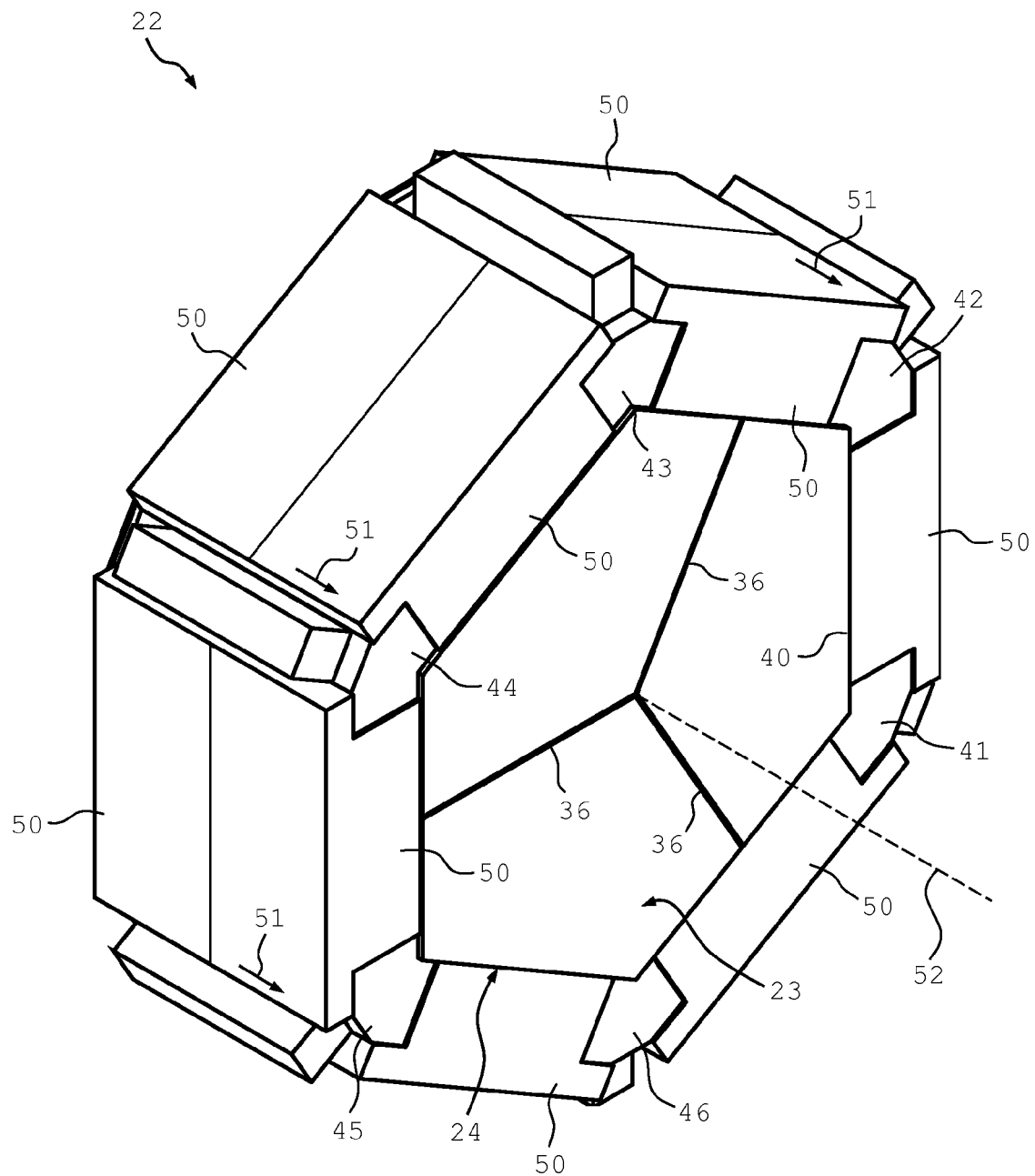
Figure 3:
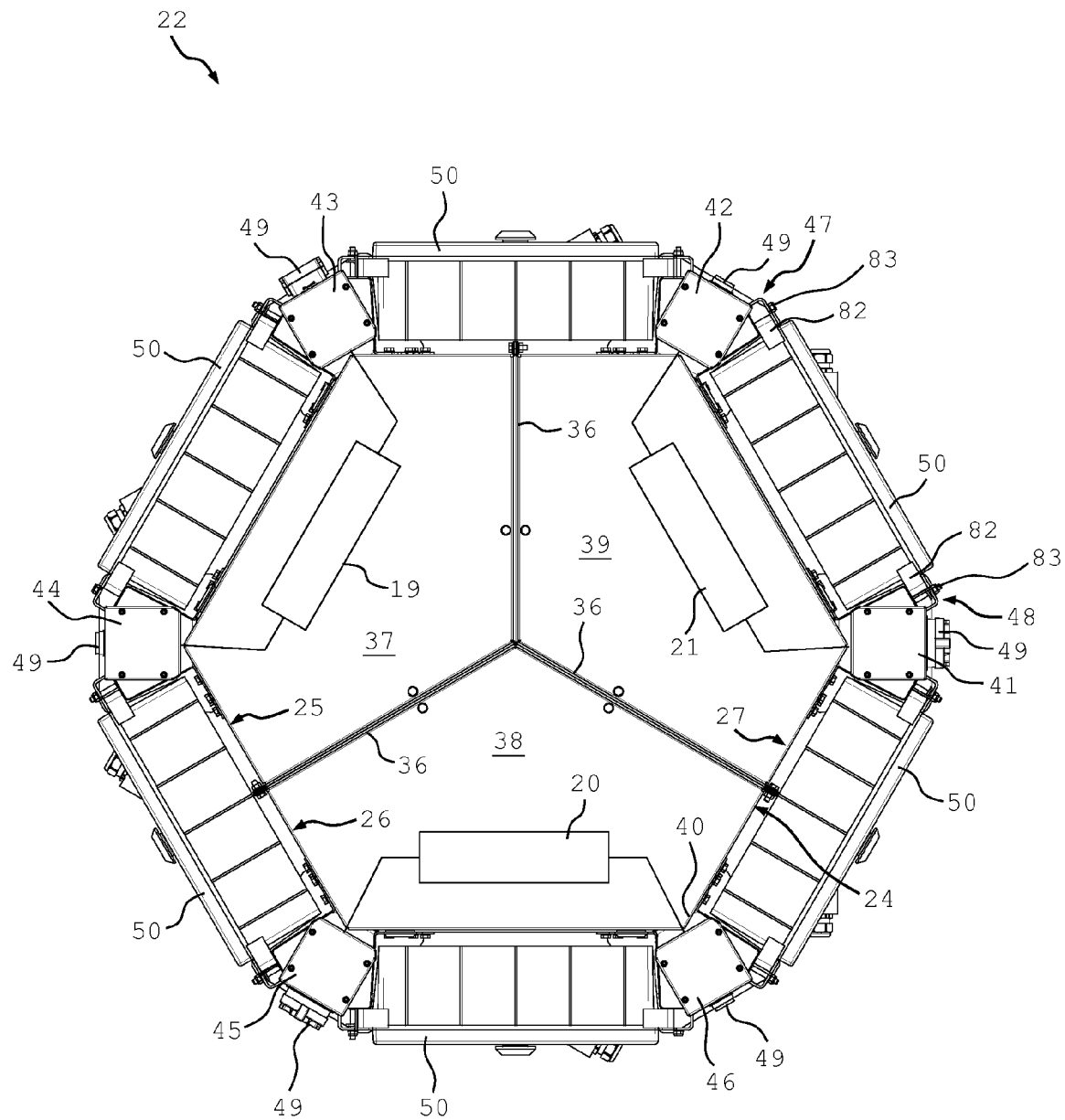
Figure 4:
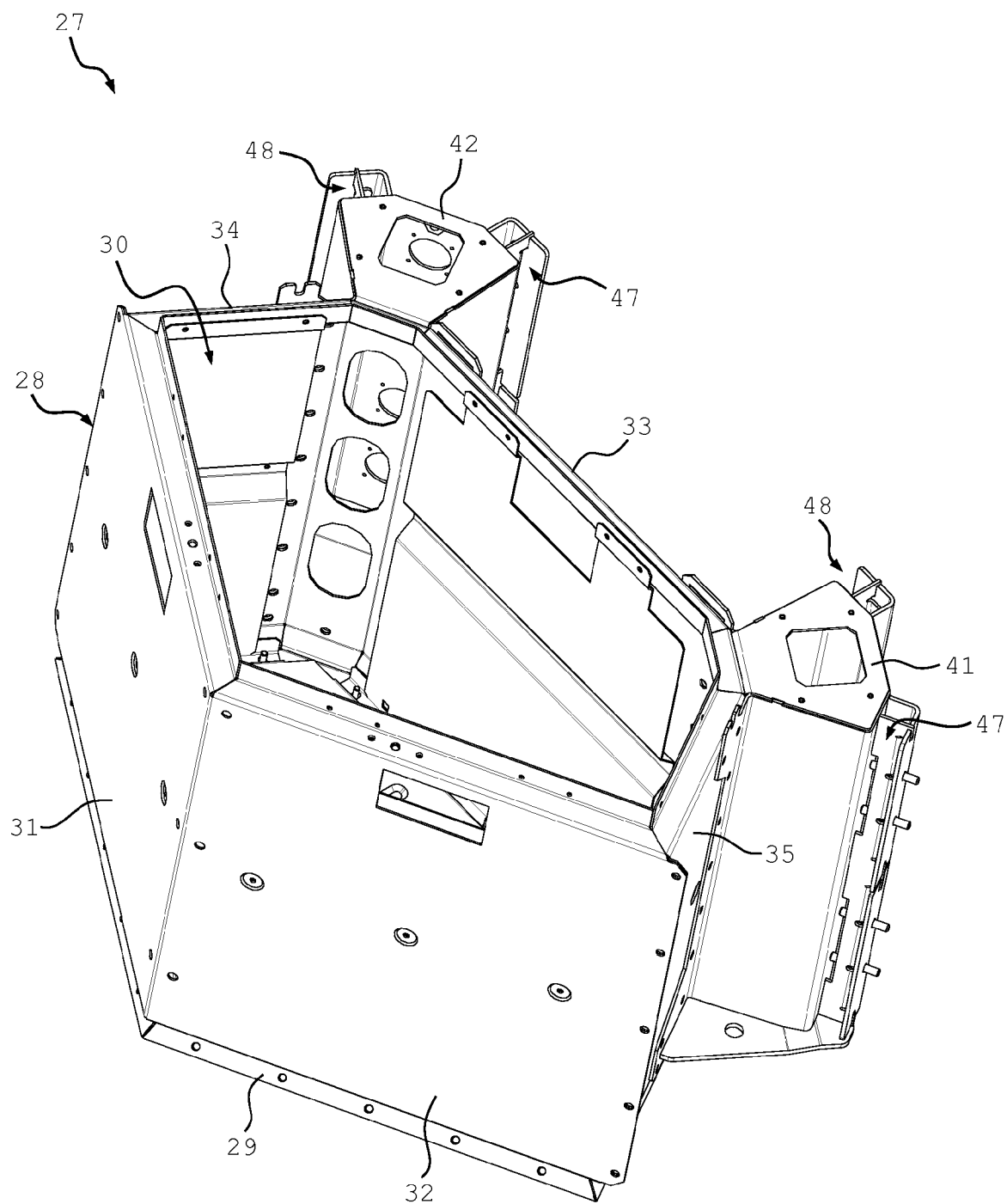
Figure 5:
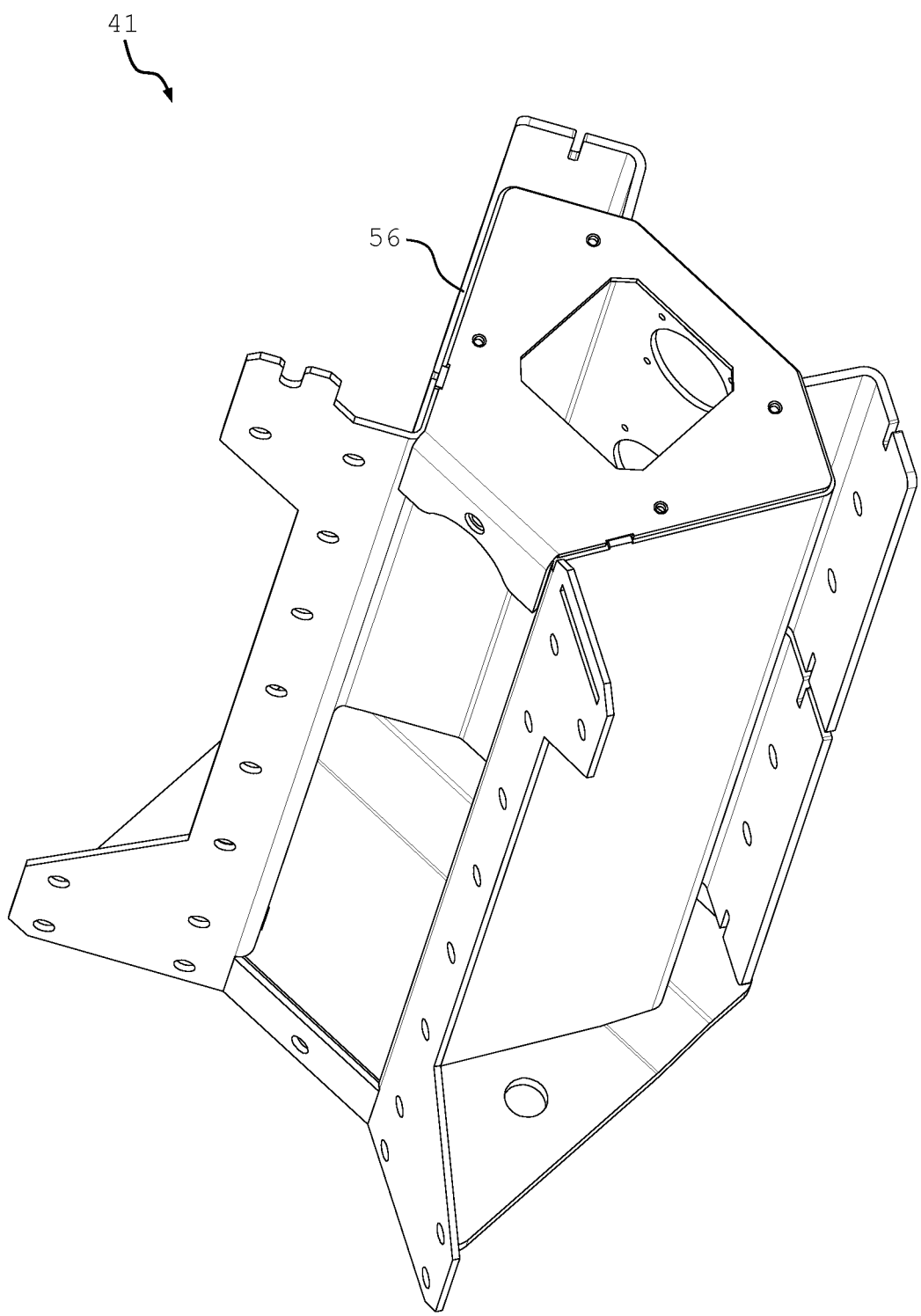
Figure 6:
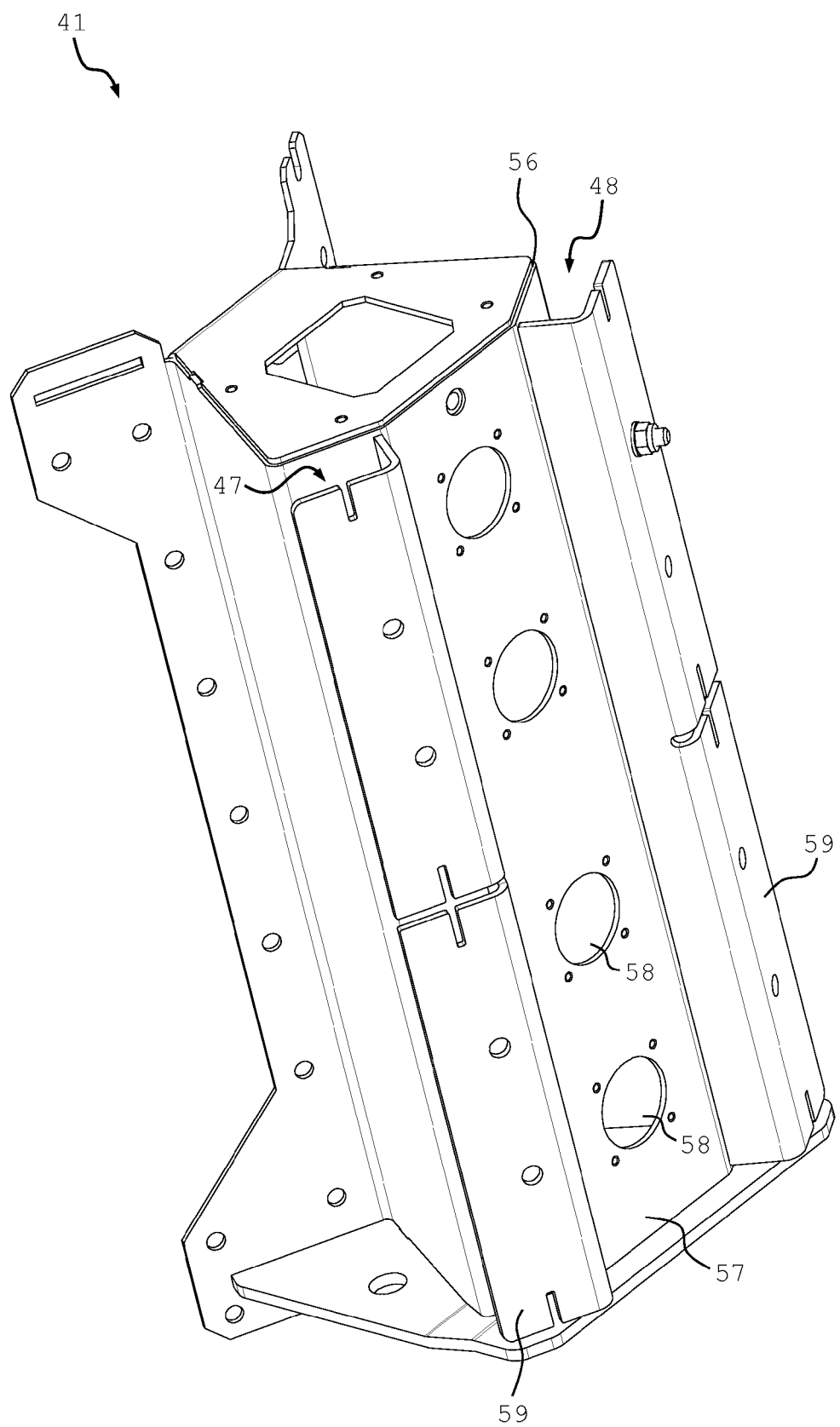
Figure 7:
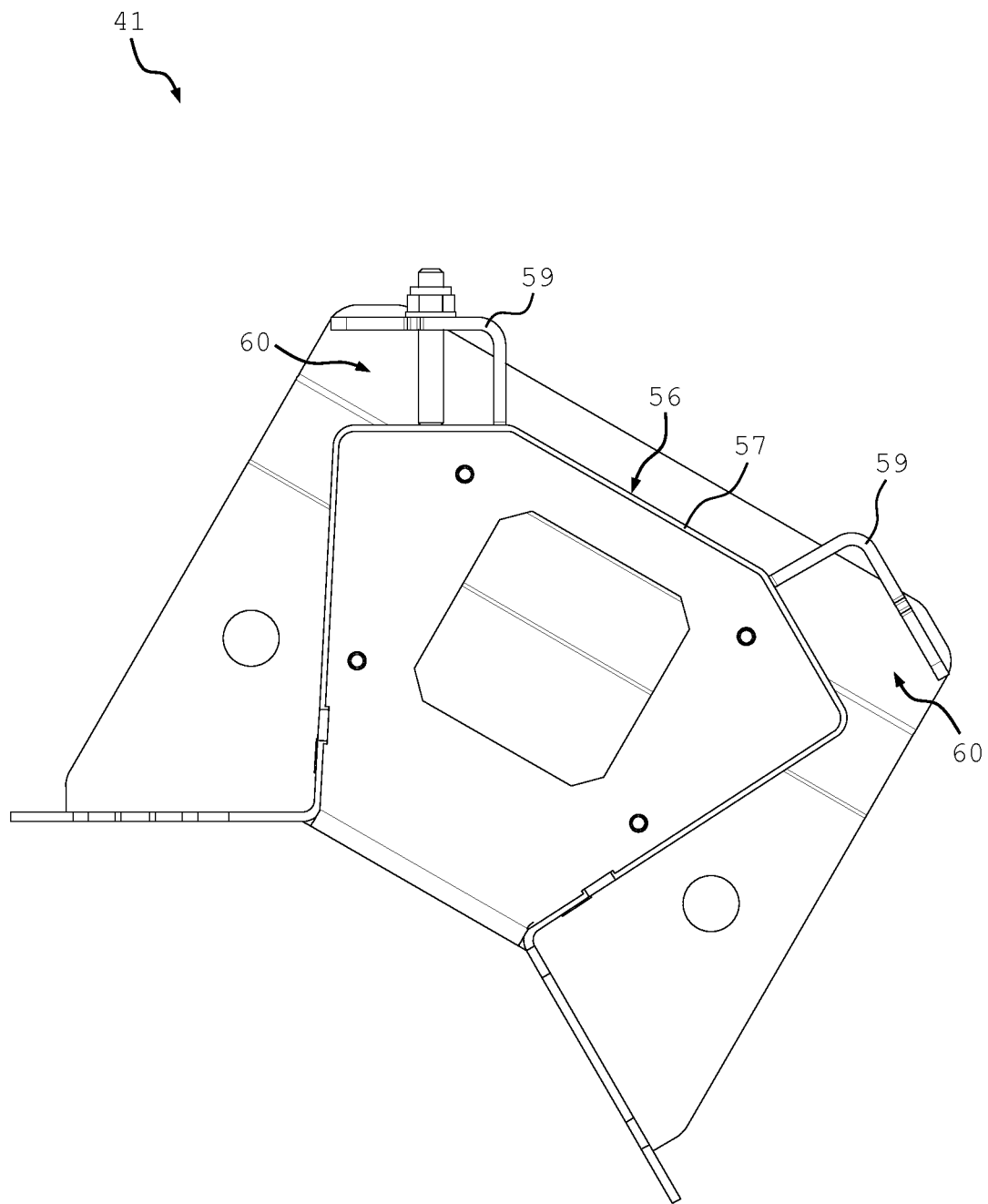
Figure 8:
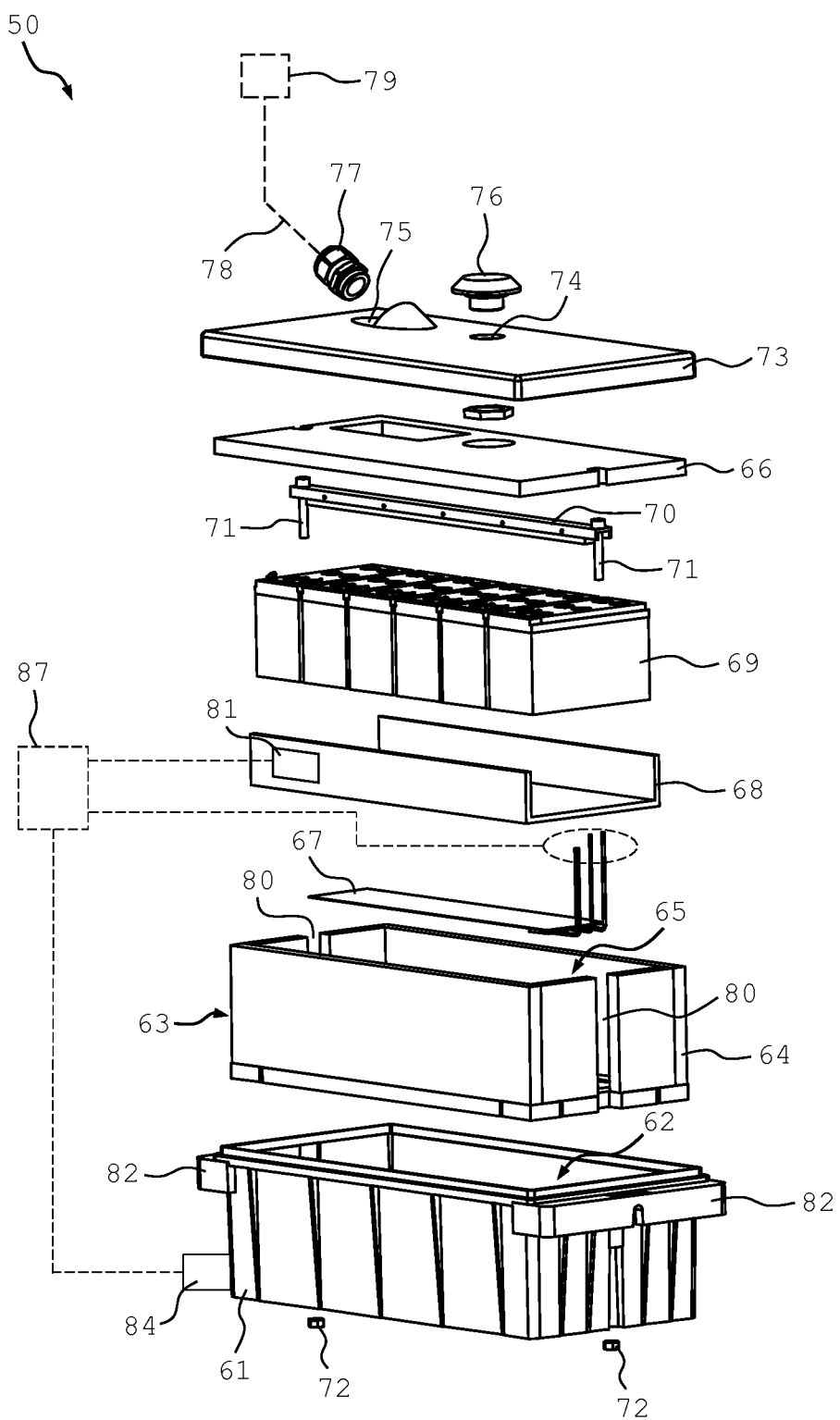
Figure 9:
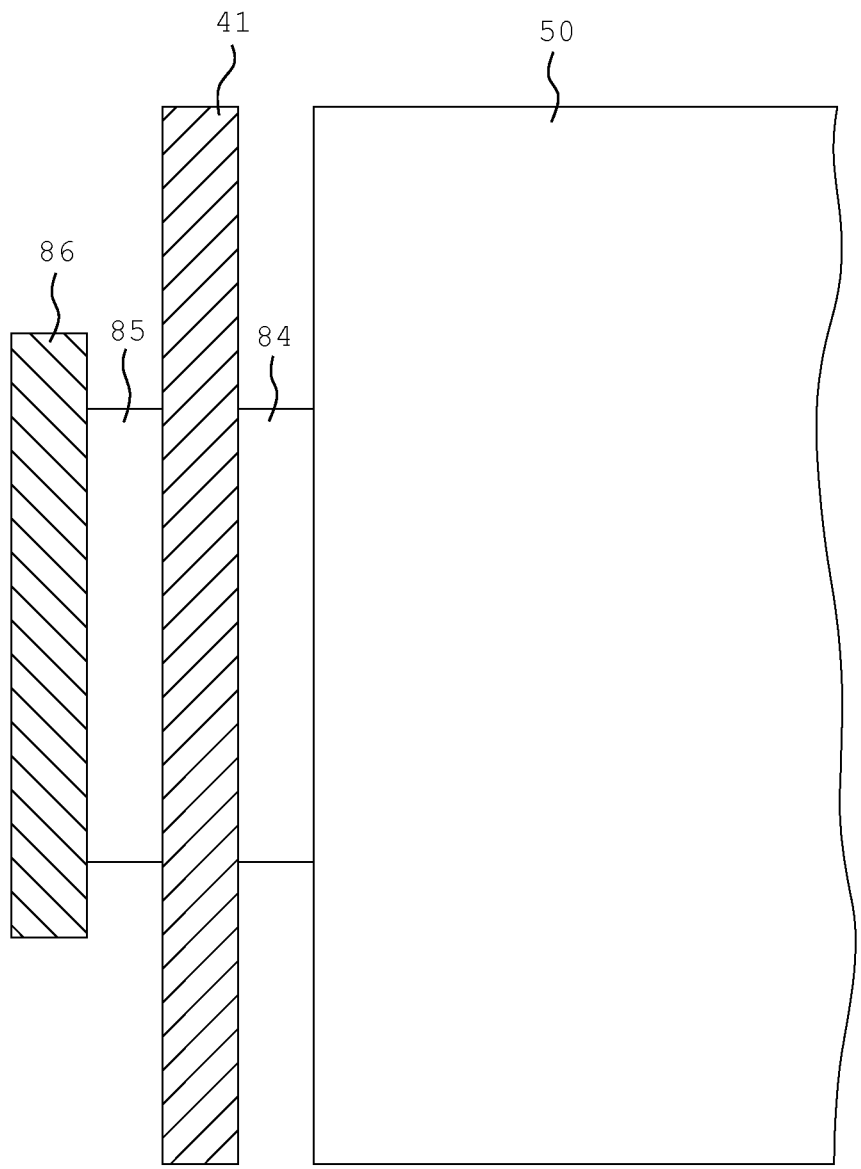

The invention is described herein after with the aid of a preferred embodiment and with reference to the accompanying drawings, in which:

FIG. 1 is a schematic view of a wind turbine with a switchgear cabinet according to an embodiment of the invention, FIG. 2 is a schematic, perspective representation of the switchgear cabinet, FIG. 3 is a plan view of the switchgear cabinet, FIG. 4 is a perspective representation of a switchgear cabinet segment, FIG. 5 is a perspective view of a corner carrier of the switchgear cabinet, FIG. 6 is another perspective view of the corner carrier, FIG. 7 is a plan view of the corner carrier, FIG. 8 is an exploded representation of an energy storage module of the switchgear cabinet, and FIG. 9 is a partial representation of a modified carrier with an energy storage module.

FIG. 1 shows a wind turbine 1 according to an embodiment of the invention, in which the wind turbine 1 comprises a tower 3 standing on a foundation 2, a machine housing 4 being arranged on the end of the tower remote from the foundation 2. The machine housing 4 has a nacelle 5, on which a rotor 6 is rotatably mounded about a rotor axis 7, the rotor comprising a rotor hub 8 and a plurality of rotor blades 9 and 10 connected thereto, which are respectively rotatably mounted about a blade axis 11 and 12 on the rotor hub 8. The rotor blades 9 and 10 extend in the direction of their blade axes 11 and 12 from the rotor hub 8, the blade axes 11 and 12 running transverse to the rotor axis 7. The rotor 6 is rotated about the rotor axis 7 by the wind 13 and is mechanically coupled by means of a rotor shaft 14 to an electric generator 15 secured to the nacelle 5, the generator being driven by the rotor 6. The generator 15 generates electrical energy and feeds this into an electric network 16. The rotor blades 9 and 10 can rotate respectively via a blade angle adjustment drive 17 and 18 about their respective blade axis relative to the rotor hub 8. The rotor 6 furthermore comprises a third rotor blade, which is mounted on the rotor hub 8 so as to rotate about a blade axis running transverse to the rotor axis 7, and which extends from the rotor hub 8 in the direction of this blade axis and can rotate about this blade axis relative to the rotor hub by means of a blade angle adjustment drive. The third rotor blade is not visible in the representation according to FIG. 1. The rotor blades are arranged uniformly distributed around the rotor axis 7, so that two adjacent rotor axes in each case enclose an angle of 120°.

The blade angle adjustment drives 17 and 18 are electrically connected respectively to an electric circuit 19 and 20. Furthermore the blade angle adjustment drive for the third rotor blade, not visible from FIG. 1, is connected to an electric circuit 21. The electric circuits 19, 20 and 21 illustrated schematically in FIG. 3 are arranged in a switchgear cabinet 22, which is arranged radially centrally in the rotor hub 8 with respect to the rotor axis 7. According to the embodiment three blade angle adjustment devices are accordingly provided, which respectively include one of the blade angle adjustment drives and one of the electric circuits. In this connection a first of the blade angle adjustment devices includes the circuit 19 and the blade angle adjustment drive 17, a second of the blade angle adjustment devices includes the circuit 20 and the blade angle adjustment drive 18, and a third of the blade angle adjustment devices includes the circuit 21 and the blade angle adjustment drive of the third rotor blade. The electric circuits are electrically connected to the respective blade angle adjustment drive.

FIGS. 2 and 3 show different view of the switchgear cabinet 22, which comprises an inner chamber 23 and a cabinet body 24 defining the inner chamber. The switchgear cabinet 24 is composed of three switchgear cabinet segments 25, 26 and 27, which are of identical construction. The switchgear cabinet segment 27 is in this connection shown in a perspective representation in FIG. 4 and comprises a peripheral segment wall 28 and also a segment floor 29. The segment wall 28 defines a segment inner chamber 30, the circumferential contour of the segment wall 28 being a pentagon. Furthermore the segment wall 28 includes inner wall parts 31 and 32 as well as outer wall parts 33, 34 and 35. The inner wall parts of the segments form partitions 36, which subdivide the inner chamber 23 into three inner chamber regions 37, 38 and 39. Each of the inner chamber regions is formed by one of the segment inner chambers, the inner chamber region 39 being formed by the segment inner chamber 30 of the segment 27. The outer wall parts of the segments together form a peripheral wall 40 of the switchgear cabinet 24, whose circumferential contour is in this case a hexagon.

Carriers (supports) 41, 42, 43, 44, 45 and 46 are arranged respectively at the corners of the wall 40, which can also be termed corner carriers (corner supports). The carriers are of identical construction and are secured to the wall 40, each of the carriers comprising two sliding guides 47 and 48. The carrier 41 is in this connection shown in different representations in FIGS. 5 to 7. Furthermore electric terminals 49 are secured to the carriers, and are electrically connected to the circuits 19, 20 and 21.

In the oppositely facing sliding guides of two adjacent carriers, respectively two electrical energy storage modules 50 are displaceably guided in a guide direction 51 and are arranged behind one another in this direction. The guide directions 51 run parallel to a switchgear cabinet axis 52, which in particular forms a central axis of the switchgear cabinet 22 and preferably coincides with the rotor axis 7. Each of the energy storage modules 50 comprises projections 82, which are arranged on oppositely facing sides of the respective energy storage module 50 and slideably engage in one another with the sliding guides 47 and 48. The energy storage modules are fixed to the carriers by clamps. For this purpose bolts 83 are provided on the sliding guides, by means of which the projections 82 can be firmly clamped to the carriers. The energy storage modules 50 are pressed by the sliding guides preferably against the wall 40 and are preferably in thermally conducting contact therewith. This allows for example a good heat exchange between the energy storage modules 50 and the cabinet body 24 by convection. Alternatively the energy storage modules 50 can however also be spaced from the wall 40.

The blade angle adjustment drives are respectively electrically connected to one of the terminals 49. Furthermore a slip-ring arrangement 53 (see FIG. 1) is electrically connected to one of the terminals 49, which in turn is electrically connected to a power supply device 54 and to a control device 55 of the wind turbine 1. The blade angle adjustment devices, in particular the electric circuits and/or the blade angle adjustment drives, are supplied with electric current from the power supply device 54. Furthermore the blade angle adjustment devices, in particular the electric circuits, are controlled by means of the control device 55. The electric circuits 19, 20 and form for their part controls for the blade angle adjustment drives, so that these are controlled by means of the electric circuits. In the event that the power supply device 54 fails, the blade angle adjustment devices, in particular the electric circuits and/or the blade angle adjustment drives, are supplied with electric current from the energy storage modules 50. The electrical energy storage modules 50 thus form an emergency power supply for the electric circuits and/or for the blade angle adjustment drives.

According to the embodiment the energy storage modules 50 are electrically connected to terminals 49 of the supports 42, 44 and 46. The blade angle adjustment drives are electrically connected to terminals 49 of the supports 41, and 45. Furthermore, the slip-ring arrangement 53 is connected to at least one terminal 49 of the supports 45.

The carrier 41 in the non-mounted state can be seen in FIGS. 5 to 7, the carrier 41 comprising a base body 56 with an outer wall 57, in which are provided a plurality of holes 58 in which the terminals 49 are installed. Furthermore, seen in the circumferential direction of the wall 40 L-shaped rails 59 are arranged on both sides of the outer wall 57 and are securely connected to the base body 56, wherein the rails 59 with the base body 56 define respectively a guide groove 60 running in the direction of the switchgear cabinet axis 52. The rails 59 thus define together with the base body 56 and the grooves 60, the sliding guides 47 and 48.

One of the energy storage modules 50 can be seen in an exploded representation in FIG. 8, wherein the energy storage module 50 comprises a housing 61 with a housing inner chamber 62. The projections 82 of the energy storage module 50 are provided on the housing 61, consisting for example of plastic. A thermally insulating casing 63, which comprises a base body 64 with an inner chamber 65 and also a cover 66, is introduced into the housing inner chamber 62. An electric heating 67 is incorporated in the inner chamber 65, and is in thermally conducting contact with a thermally conducting intermediate element 68, consisting for example of aluminium. The intermediate element 68 is furthermore in thermally conducting contact with a plurality of electrical energy storage devices 69, which are introduced together with the intermediate element 68 into the inner chamber 65. Furthermore the intermediate element 68 is in thermally conducting contact with a temperature sensor 81, so that the heating 67 can be adjusted. A temperature regulation device 87, which is electrically connected to the heating 67 as well as to the sensor 81, is provided in order to adjust the heating 67. The temperature regulation 87 is shown schematically in FIG. 8 and is preferably arranged in the cabinet body 24.

The arrangement of base body 64, heating 67, intermediate element 68 and energy storage device 69 is fixed by means of a clamp 70 in the inner chamber 62, the clamp 70 being secured by means of bolts 71 and nuts 72 to the housing 61. In this connection the screws 71 run in longitudinal slits 80 that are provided in side walls of the casing 63. The clamp 70 is preferably engaged in the longitudinal slits 80.

The inner chamber 65 is covered by means of the cover 66 and the housing 61 is closed by means of a housing lid 73, consisting for example of plastics. The housing lid 73 is adapted in particular to the housing 61 and comprises two through holes 74 and 75, a degassing device 76 being located in the hole 74 and a cable duct 77 being located in the hole 75. The cable duct 77 serves for the exit of a schematically illustrated cable 78 from the housing 61, wherein the cable 78 is electrically connected within the housing 61 to the energy storage devices 69, which are preferably electrically connected in series. Outside the housing 61 a plug 79 is connected to the cable 78, and can be electrically connected to the terminals 49.

A Peltier element 84 is also schematically illustrated, which abuts externally against the housing 61 and is in thermally conducting contact therewith. The Peltier element is securely connected to the cabinet body 24, in particular to one of the carriers, and is preferably electrically coupled to the temperature regulation device 87. The housing 61 and thus also the energy storage module 50 can be cooled by means of the Peltier element 84, so that a climatisation of the energy storage module 50 is possible with the aid of the temperature regulation device 87. The energy storage module 50 is preferably in sliding contact with the Peltier element 84, so that this remains on the switchgear cabinet 22 during a replacement of the energy storage module 50. Alternatively the Peltier element can however also be permanently securely connected to the energy storage module 50 and is in this case preferably arranged in the housing 61. A plurality of Peltier elements are preferably provided for cooling the energy storage module 50.

A partial representation of a modified carrier 41 can be seen in FIG. 9, wherein a plurality of Peltier elements 84 are arranged spaced apart from one another between the carrier 41 and the energy storage module 50 in the direction of the cabinet axis 52. The Peltier elements 84 are in thermally conducting contact with the energy storage module 50 as well as with the carrier 41. Furthermore a plurality of Peltier elements 85 are arranged spaced apart from one another on a side of the carrier 41 facing away from the Peltier elements 84 in the direction of the cabinet axis, the Peltier elements 85 being in thermally conducting contact with the carrier 41. In addition the Peltier elements 85 are thermally coupled to one another by a thermally conducting element 86, preferably consisting of aluminium, on their side facing away from the carrier 41. This arrangement takes account of the fact that the carrier is made for example of steel and is thus a relatively poor thermal conductor. The arrangement according to FIG. 9 allows a good cooling of the energy storage module 50 despite the poor thermal conductivity properties of the carrier 41. The Peltier elements are preferably permanently securely connected to the carrier 41.

The invention claimed is:

1. A switchgear cabinet for a wind turbine comprising:
   a cabinet body defining an inner chamber and having a peripheral wall;
   at least one electric circuit arranged in the inner chamber;
   at least one electrical energy storage module connected to the cabinet body, the at least one energy storage module being arranged on an outer side of the cabinet body and detachably secured thereto; and
   a carrier arranged at a corner of the peripheral wall on the outer side thereof and securely connected thereto.

2. The switchgear cabinet according to claim 1, wherein the cabinet body is secured to a wind turbine.

3. The switchgear cabinet according to claim 2, wherein the cabinet body is secured to a rotor of the wind turbine rotatable about a rotor axis, the rotor comprising a rotor hub and a plurality of rotor blades mounted thereon, which respectively extend from the rotor hub along a blade axis running substantially transverse to the rotor axis.

4. The switchgear cabinet according to claim 3, further comprising a plurality of blade angle adjustment devices and the inner chamber comprising a plurality of inner chamber regions, with each one of said blade angle adjustment devices being associated with a specific one of the plurality of rotor blades, by means of which the respective rotor blade is rotatable about its blade axis.

5. The switchgear cabinet according to claim 3, further comprising at least one partition subdividing the inner chamber into a plurality of inner chamber regions, wherein a number of the inner chamber regions is larger than or equal to the number of rotor blades.

6. The switchgear cabinet according to claim 4 further comprising a plurality of electric circuits, and wherein each of the inner chamber regions is associated with a specific one of the rotor blades, each of the plurality of inner chamber regions having one of the plurality of electric of circuits associated with a specific one of the blade angle adjustment devices arranged therein.

7. The switchgear cabinet according to claim 1, wherein the at least one energy storage module is arranged on the outer side of the peripheral wall.

8. The switchgear cabinet according to claim 1, wherein the at least one energy storage module is displaceably mounted in a guide direction on the cabinet body.

9. The switchgear cabinet according to claim 8, wherein a plurality of the energy storage modules are arranged behind one another in the guide direction.

10. The switchgear cabinet according to claim 1, wherein the peripheral wall has a circumferential contour defining a polygon.

11. The switchgear cabinet according to claim 1, wherein the carrier comprises a guide on which the at least one energy storage module is displaceably guided.

12. The switchgear cabinet according to claim 1, further comprising electric terminals provided on the carrier and electrically connected to the at least one electric circuit.

13. The switchgear cabinet according to claim 12, wherein the at least one electrical energy storage module is electrically connected to the electric terminals.

14. The switchgear cabinet according to claim 4, further comprising a plurality of the electric circuits, and wherein each one of the blade angle adjustment devices includes an electrically actuatable blade angle adjustment drive electrically connected to an associated one of the electric circuits.

15. The switchgear cabinet according to claim 14, further comprising a nacelle supporting the rotor for rotation about the rotor axis, and a plurality of electrical connecting leads guided via a slip-ring arrangement to the nacelle and connected to the plurality of electric circuits.

16. The switchgear cabinet according to claim 15, wherein the electrical connecting leads are electrically connected to at least one of a power supply device and to a control device of the wind turbine.

17. The switchgear cabinet according to claim 1, wherein the electrical energy storage module further comprises at least one of an accumulator and an electrical capacitor.

18. The switchgear cabinet according to claim 1, wherein the cabinet body further comprises a plurality of electrical energy storage modules, a plurality of electric circuits, and a plurality of segment walls, each said segment wall having an inner body portion defining a segment inner chamber region, and an outer wall portion forming with one of the electrical energy storage modules fastened on the outside thereof, wherein one of the plurality of electric circuits is arranged in each of the segment inner chambers.

19. An electrical energy storage module for a switchgear cabinet having a cabinet body and a carrier at a corner thereof, the electrical energy storage module comprising:
   a housing having a housing wall;
   at least one electrical energy storage device arranged in the housing, and
   wherein the housing is configured to be detachably secured to an outer side of the cabinet body of the switchgear cabinet using the carrier.

20. The electrical energy storage module according to claim 19, further comprising at least one heating element arranged in the housing, by means of which the at least one electrical energy storage device can be heated.

21. The electrical energy storage module according to claim 20, further comprising a thermally conducting intermediate element arranged between the heating element and the at least one electrical energy storage device.

22. The electrical energy storage module according to claim 19, further comprising a temperature sensor arranged in the housing and in thermally conducting contact with the at least one electrical energy storage device.

23. The electrical energy storage module according to claim 19, wherein the at least one electrical energy storage device is arranged in a thermally insulating casing that is provided in the housing.

24. The electrical energy storage module according to claim 19, wherein the at least one electrical energy storage device is fixed in the housing by means of a holder.

25. The electrical energy storage module according to claim 19, further comprising a degassing device arranged in the housing wall, by means of which gases released from the at least one electrical energy storage device are vented out from the housing.

26. The electrical energy storage module according to claim 19, further comprising a cable duct, through which a cable electrically connected to the at least one electrical energy storage device is led out from the housing.

27. The electrical energy storage module according to claim 19, further comprising at least one of an accumulator or an electrical capacitor associated with the at least one electrical energy storage device.

* * * * *